United States Patent
Hunter et al.

(10) Patent No.: US 7,801,926 B2
(45) Date of Patent: Sep. 21, 2010

(54) PROGRAMMABLE LOGIC AND CONSTRAINTS FOR A DYNAMICALLY TYPED STORAGE SYSTEM

(75) Inventors: Jason T. Hunter, Redmond, WA (US); David J. Nettleton, Seattle, WA (US); Gregory S. Friedman, Redmond, WA (US); David J. Simons, Louisville, CO (US); Lev Novik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 11/562,438

(22) Filed: Nov. 22, 2006

(65) Prior Publication Data

US 2008/0120332 A1    May 22, 2008

(51) Int. Cl.
*G06F 7/00* (2006.01)
*G06F 17/00* (2006.01)
*G06F 17/20* (2006.01)

(52) U.S. Cl. .................. 707/802; 706/60; 715/200; 715/255

(58) Field of Classification Search ............... 707/103, 707/103 R, 100, 999.1; 703/13–22; 715/200–277, 715/513; 706/60

See application file for complete search history.

(56) References Cited

U.S. PATENT DOCUMENTS

| | | | |
|---|---|---|---|
| 4,658,370 A * | 4/1987 | Erman et al. ........... | 706/60 |
| 5,315,709 A | 5/1994 | Alston | |
| 5,548,761 A | 8/1996 | Balsundaram | |
| 5,937,410 A | 8/1999 | Shen | |
| 6,272,521 B1 | 8/2001 | Jablonski | |
| 6,553,141 B1 | 4/2003 | Huffman | |
| 6,591,276 B1 * | 7/2003 | Dockter et al. ......... | 707/103 R |
| 6,910,182 B2 | 6/2005 | Huang | |
| 7,096,229 B2 | 8/2006 | Dettinger et al. | |
| 2001/0042058 A1 * | 11/2001 | Harrington et al. ........ | 707/1 |
| 2002/0194220 A1 | 12/2002 | Sluiman | |
| 2003/0018694 A1 | 1/2003 | Fox | |
| 2003/0051226 A1 | 3/2003 | Zimmer | |
| 2003/0121026 A1 | 6/2003 | Wang | |
| 2003/0167444 A1 | 9/2003 | Zorc | |

(Continued)

OTHER PUBLICATIONS

Simonet. "An Extension of HM(X) with Bounded Existential and Universal Data-Types" (2003) Proceedings of the 8th ACM SIGPLAN International Conferences on Functional Programming, 15 pages.

(Continued)

*Primary Examiner*—Cheyne D Ly
*Assistant Examiner*—Bao G Tran
(74) *Attorney, Agent, or Firm*—Workman Nydegger

(57) ABSTRACT

Embodiments define a set of rules such that a type designer can express as part of a type's definition whether the type has extended the logic and/or constraints of its ancestral types in such a way that applications written against that ancestral type will continue to function correctly. Nonconformity can also be indicated and an embodiment can enforce limitations on a set of operations that can be performed on such instances when treated as their ancestral types. Applications can use standard interfaces to discover from embodiments whether such limitations can be in force for a particular instance and provide a user experience that accounts for those limitations. Embodiments can also provide mechanisms to enable type designers to limit a degree of extensibility for both types and/or Items.

16 Claims, 10 Drawing Sheets

U.S. PATENT DOCUMENTS

| | | | |
|---|---|---|---|
| 2003/0220893 A1 | 11/2003 | Dettinger et al. | |
| 2004/0015511 A1 | 1/2004 | Seefeldt | |
| 2004/0044990 A1 | 3/2004 | Schloegel | |
| 2004/0073870 A1 | 4/2004 | Fuh | |
| 2004/0139126 A1 | 7/2004 | Thacker | |
| 2004/0261008 A1* | 12/2004 | Pepin et al. | 715/500 |
| 2005/0014494 A1 | 1/2005 | Owen | |
| 2005/0050020 A1 | 3/2005 | Oki | |
| 2005/0050073 A1* | 3/2005 | Demiroski et al. | 707/100 |
| 2005/0091255 A1 | 4/2005 | Rajan et al. | |
| 2005/0091585 A1* | 4/2005 | Parikh et al. | 715/517 |
| 2005/0262113 A1* | 11/2005 | Arora et al. | 707/100 |
| 2005/0262378 A1 | 11/2005 | Sleeman et al. | |
| 2005/0289157 A1 | 12/2005 | Vaschillo et al. | |
| 2006/0064425 A1 | 3/2006 | Kakivaya et al. | |
| 2006/0184571 A1 | 8/2006 | Liu et al. | |
| 2006/0195459 A1 | 8/2006 | Nori et al. | |
| 2006/0195460 A1* | 8/2006 | Nori et al. | 707/100 |
| 2006/0195477 A1 | 8/2006 | Deem et al. | |
| 2006/0200486 A1 | 9/2006 | Castro et al. | |
| 2006/0248092 A1* | 11/2006 | Keller et al. | 707/100 |
| 2007/0011194 A1* | 1/2007 | Gurevich | 707/103 Y |

OTHER PUBLICATIONS

Shoshani. "A Logical-Level Approach to Data Base Conversion" (1975) Proceedings of 1975 ACM SIGMOD International Conference on Management of Data, 11 pages.

Buneman. "Inheritance and Persistence in Data Base Conversion" (1987) ACM Computing Surveys, 12 pages.

Notice of Allowance dated Oct. 1, 2009 cited in U.S. Appl. No. 11/128,893.

Office Action dated Oct. 27, 2009 cited in U.S. Appl. No. 11/094,923.

Ferrandia, et al., "Implementing Lazy Database Updates for an Object Database System", In Proceedings of the 20th International Conference on Very Large Data Bases, 1994, pp. 261-272, Santiago, Chile.

D. Garlan, et al., "TransformGen: Automating The Maintenance of Structure-Oriented Environments", ACM Transactions on Programming Languages and Systems, May 1994, pp. 727-774, vol. 16, No. 3.

B.S. Lerner, "A Model for Compound Type Changes Encountered in Schema Evolution", ACM Transactions on Database Systems, pp. 83-127, vol. 25, No. I, Mar. 2000.

A.H. Skara, "The Management of Changing Types in an Object-Orientated Database", In Proceedings of the Conference on Object-Orientated Programming Systems, Language and Applications, OOPSLA'86, Apr. 1986, pp. 483-495, ACM.

Office Action dated Oct. 2, 2007 cited in U.S. Appl. No. 11/128,893.

Office Action dated Jul. 3, 2008 cited in U.S. Appl. No. 11/128,893.

Office Action dated Mar. 6, 2009 cited in U.S. Appl. No. 11/128,893.

Office Action dated Nov. 28, 2008 cited in U.S. Appl. No. 11/094,923.

Office Action dated May 15, 2009 cited in U.S. Appl. No. 11/094,923.

Office Action dated Oct. 5, 2007 cited in U.S. Appl. No. 11/185,155.

Office Action dated Mar. 5, 2008 cited in U.S. Appl. No. 11/185,155.

Office Action dated Jul. 18, 2008 cited in U.S. Appl. No. 11/185,155.

Office Action dated Mar. 13, 2009 Cited in U.S. Appl. No. 11/18,155.

* cited by examiner

PROGRAMMABLE LOGIC AND CONSTRAINTS FOR A DYNAMICALLY TYPED STORAGE SYSTEM

RELATED APPLICATIONS

This application is related to co-pending and co-assigned U.S. applications "VERSION TOLERANT SERIALIZATION," filed on Mar. 31, 2005 and assigned Ser. No. 11/094,923; "DATA MODEL AND SCHEMA EVOLUTION," filed on May 13, 2005 and assigned Ser. No. 11/128,893; and "SCHEMA GRAMMAR AND COMPILATION," filed on Jul. 20, 2005 and assigned Ser. No. 11/185,155 which claims priority to provisional application entitled "SCHEMA GRAMMAR AND COMPILATION," filed Feb. 28, 2005 and assigned Ser. No. 60/657,521. The above-noted applications are incorporated herein by reference.

BACKGROUND

In a dynamically typed storage system, a shared data store (e.g. database) provides common backing for a varied collection of applications. A unit of storage is an "item" formed by a collection of smaller units called "entities" with one Entity acting as a core or central Entity. Each Entity is associated with a physical type and a whole Item expresses a logical type based on the superposition of all contributing physical types but strongly biased by the type of its core Entity. Applications are implemented in terms of either the physical and/or logical types and perform a set of operations on the instances of those types including but not limited to reading, updating, and complex instance-specific operations (e.g., Verbs, Methods, etc.).

Types, both physical and logical, form a hierarchical structure such that one type is said to derive from another. An instance of a subtype may be treated as and operated on as if it were any of its ancestral types. Subtypes may extend, but not alter, the data definition, logic, or constraints of its ancestral types. In addition, supplementary Entity instances may be "composed" with existing Items and are said to extend or augment the data of that instance. The logical type of that instance, so extended, can similarly be treated as or operated on as if it were the logical type without such extensions.

The data in the storage system is shared and operated on by all applications such that no application owns a specific piece of data or controls the ability of other applications to use or extend that data subject to security and policy. Physical types may be introduced to the system at any time that extend existing types and the definer of a type is a distinct agent from the applications that use that type (though in practice applications will likely act to introduce types they intend to use if they are not already available). Because types may be introduced at any time, no application can be expected to implement the appropriate logic for all types whose instances it may encounter.

Thus, it is desirable to obtain a dynamically typed storage system such that the system can allow type designers to express the logic and constraints necessary to ensure the consistency of a type's instances both at the Entity and Item level. It should also allow the most interactive use of instances while disallowing operations that would violate the consistency of its type. Applications should also be allowed to be written without implementing or executing the logic of types unknown at the time of development. It is also desirable to allow the type system to continue to be extended with new types, both physical and logical, without adversely impacting existing applications' ability to execute in a predictable manner.

SUMMARY

A framework in which object types can be defined along with logic and constraints is provided. This allows embodiments to define a set of rules such that a type designer can express as part of the type's definition whether the type has extended the logic and/or constraints of its ancestral types in such a way that applications written against that ancestral type will continue to function correctly. In the event that a type extends in a manner that does not conform to the logic implemented by its ancestral types, a type can so indicate and an embodiment can enforce limitations on a set of operations that can be performed on such instances when treated as their ancestral types.

Applications, however, can use standard interfaces to discover from embodiments whether such limitations can be in force for a particular instance and provide a user experience that accounts for those limitations (e.g., a "read-only mode" or "grayed UI", etc.). Furthermore, embodiments can provide mechanisms to enable type designers to limit a degree of extensibility for both types (through subtyping) and/or Items (through composition of supplementary Entities), thus, ensuring that the full rich experience of existing applications need not be encumbered by over extension.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
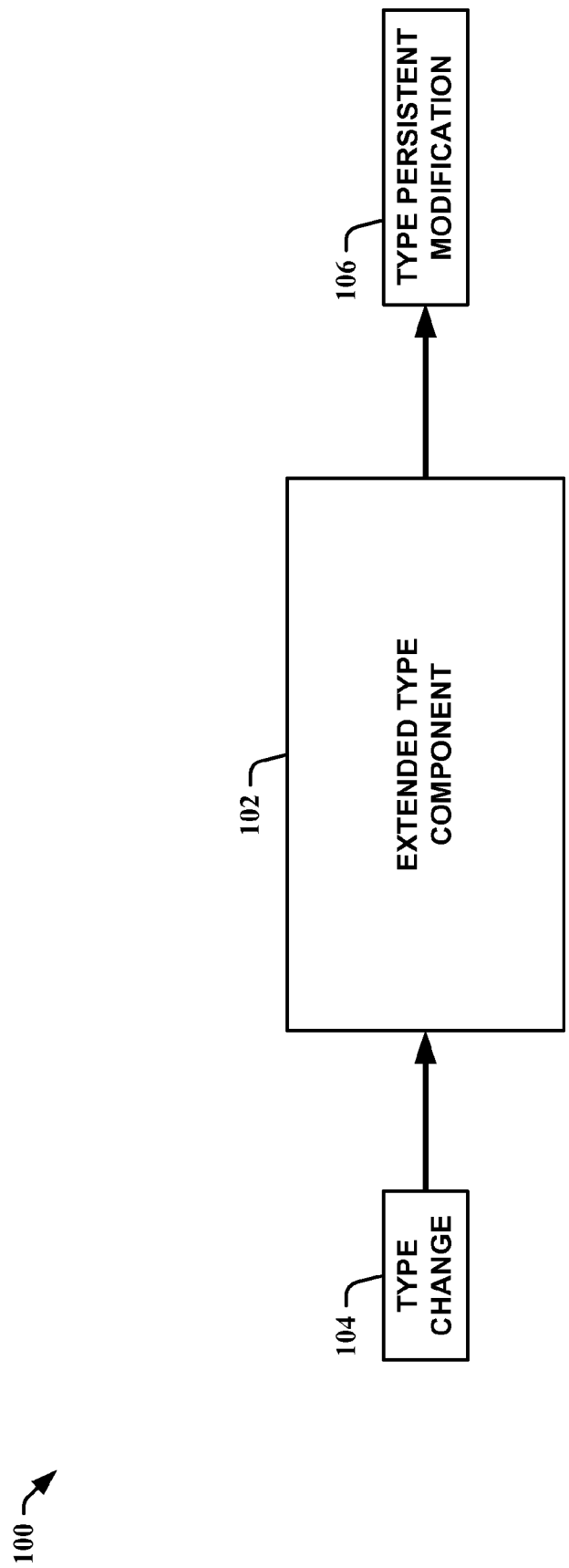
FIG. 1 is a block diagram of an extended type system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Embodiments herein provide a framework in which object types can be defined along with logic and/or constraints. This allows a set of rules utilized by a type designer to define whether a type has extended the logic or constraints of its ancestral types. This allows continued function of applications written against that ancestral type. A type can also indicate that it no longer conforms to logic implemented by its ancestral types, and embodiments can then impose limitations on a set of operations that may be performed on such instances when treated as their ancestral types. Embodiments can also provide mechanisms that allow type designers to limit the degree of extensibility for both types and Items to ensure that existing applications are not hampered by over extension of an object type.

Embodiments can indicate the manner in which types show their compatibility with their supertypes, both at an Entity level (trust relationships between physical types) and/or at an Item level ("structural" composition definition and enforcement). Embodiments can also utilize partial materialization metadata at an instance level coupled with type specific metadata on compatibility to make operational decisions at run-time (e.g., IsWritable, see infra) along with algorithms for enforcement of those decisions (e.g., SaveChanges, see infra). Embodiments can also have the ability to define both application-based logic (e.g. IsValid, see infra) and system-based logic (e.g., Policy, see infra) and/or to define both data definition (e.g., NotValidated Properties, see infra) and operations (Platform Verbs) that cannot be extended. This allows the most interactive use of object type instances without violating the consistency of types.

FIG. 1 illustrates an extended type system 100 that employs an extended type component 102 to determine if a type change 104 is permissible. Permissible changes to type definitions are then saved to storage as a type persistent modification 106. The extended type system 100 restricts editing or modification of a real-time database object based on meta-data about them and the amount of information that could have been materialized for an application. Applications that know the entire type of an object are free to edit it to its full extent, but those that only know a part of the information about the object can only edit the part that can be edited with the knowledge that they have. The extended type system 100 allows augmentation to a schema definition language to describe what the constraints are for a type and the logic to use during run-time to exploit that information to enforce writability.

Dynamically typed storage systems or object persistent systems such as, for example, Microsoft's WinFS typically have a type system as a core component that allows software developers to define a conceptual type so they can produce a type called "car," for example, which might have properties such as, for example, a manufacturer, model, year, maximum speed, etc. Once a type is defined, the system is provisioned to store instances of that type. Subsequent software developers can create subtypes such as, for example, four-wheel drive car, sports car, etc. that are known as derived types. Applications that expect a type called "car" may not act appropriately when they encounter a subtype called "sports car." This impacts reliability and predictability of the software.

The extended type system 100 allows type designers the ability to control, for example, how derivations and also future versions of types can change. Thus, application developers have more explicit control and types are under more explicit control over how versioning and subtyping influence how their applications run. In one embodiment of the extended type system 100, for example, a set of augmentations to a schema grammar which utilizes extensible markup language (XML) allows a developer to augment the XML to control these type constraint characteristics. Run-time logic is then created by the extended type system 100 such that when applications attempt to interact with instances of these type classes the interactions are constrained by declarations that were previously introduced into the XML.

Figure 2:
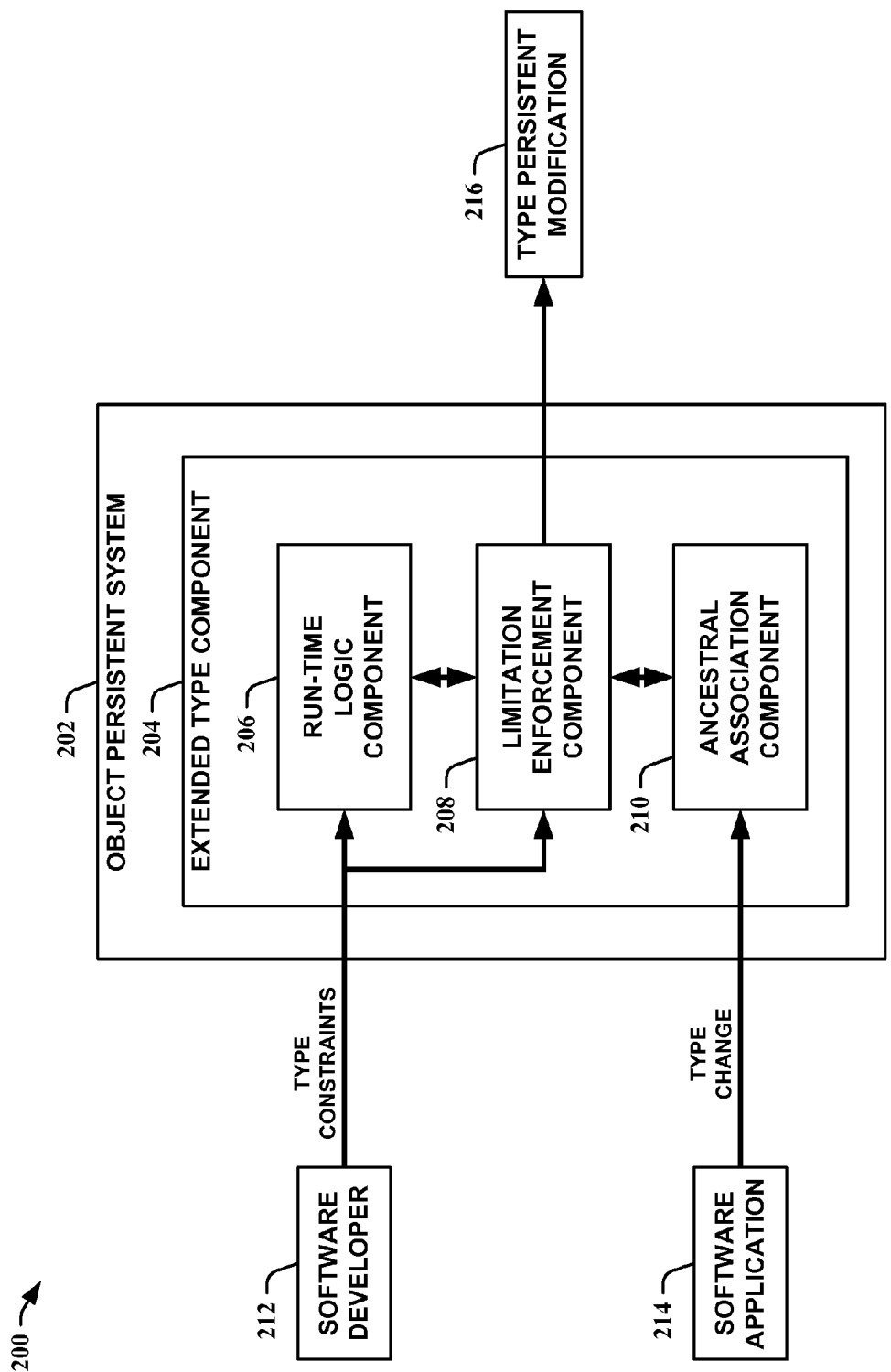
FIG. 2 is a block diagram of an extended type system operating with an object persistent system in accordance with an aspect of an embodiment.

An extended type system 200 which resides with an object persistent system 202 is shown in FIG. 2. The extended type system 200 employs an extended type component 204 that accepts type constraints from a software developer 212 and a type change from a software application 214 and determines if a type persistent modification 216 can be provided. The extended type component 204 utilizes a run-time logic component 206 that receives type constraints and creates run-time logic based on those type constraints. The extended type component 204 also utilizes a limitation enforcement component 208 that enforces the run-time logic and the constraints for a given type. When a change to a type definition passes the run-time logic and/or constraints, the type definition change can be saved as the type persistent modification 216. The extended type component 204 also utilizes an ancestral association component 210 that receives type changes and determines if the associated type is treated as an ancestral type. Under those conditions, the ancestral association component 210 interacts with the limitation enforcement component 208 to enforce any logic and/or constraints regarding that type.

Figure 3:
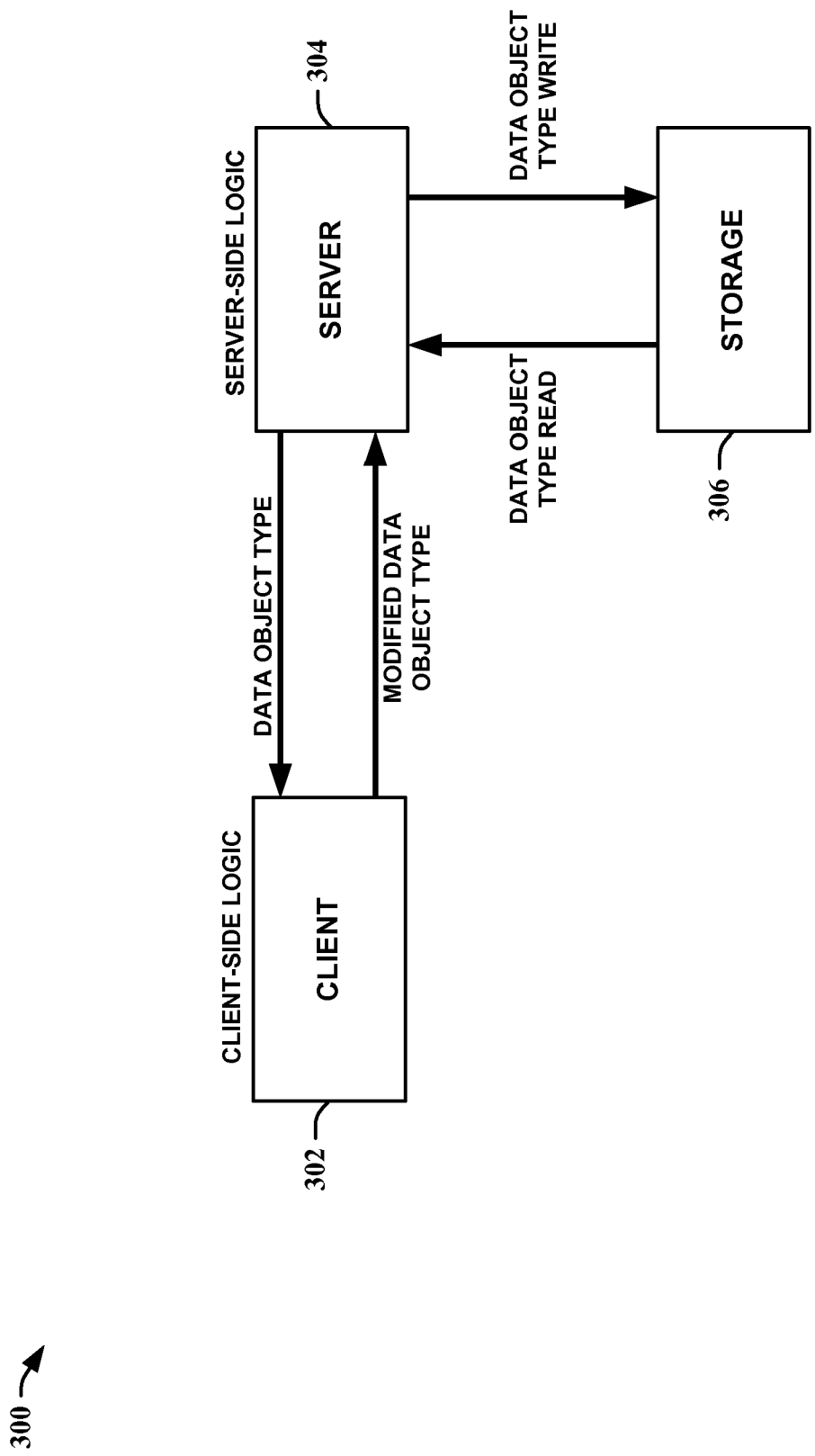
FIG. 3 is an illustration of client-server interactions in accordance with an aspect of an embodiment.

Often, a client-server relationship exists between a dynamically typed storage system and a user or application. FIG. 3 illustrates client-server interactions 300 for an extended type system. Thus, functionality for the extended type system can reside on a client 302 and/or a server 304. The server 304 in this example provides interaction capabilities with both the client 302 and storage 306 for the dynamically typed storage system. The client-side logic for the extended type system can receive a requested data object type and apply constraints and/or logic indicated by the server-side logic of the extended type system for that particular data object type. The server-side logic on the server 304 reads the data object type from the storage 306 when requested by the client 302. Indicators representative of structure and/or trust relationships and the like (described in detail infra) can also be stored along with the data object type. These indicators are typically set by type designers during software development of a core or super type. Thus, the client-side logic can interpret these indicators and determine if a software application running on the client 302 can augment the data object type. If so, a modified data object type can be sent to the server 304 from the client 302 for saving to the storage 306. The server-side logic can then apply additional logic regarding constraints and/or logic (policy) if necessary to determine if the modified data object type can be persistently stored in the storage 306. The logic and/or constraints are atomically applied and, thus, any failure prohibits writability. If successful, the modified data object type is then written to storage 306. Determination of the logic and constraints are described in greater detail infra.

It should be noted that a "storage system" utilized herein can have any appropriate structure including 1, 2, or 3-tier or even n-tier systems, where n is an integer from one to infinity. A first tier can be multi-tiered as well. For illustration purposes, a 2-tier system is assumed which can be modeling an n-tier system such that the second tier of the system is meant to encompass other tiers except a client tier. When system-based logic is referred to, no distinction is made as to which of these backend tiers that logical is implemented in.

A dynamically typed storage system data model and schema language typically define a type system and its associated storage such that types can be introduced dynamically at any time. Multiple applications can be implemented against these types utilizing different subsets of those types known to the system. Applications are written against code implementing the client-side logic for a type. Different versions of a type can exist at different times, but the system only knows about a single version at a time and subsequent versions are additive-only evolutions of previous versions. Subtypes of existing types can be created at any time. Subtypes are additive relative to their ancestral types and an application can be written against an ancestral type when dealing with an instance.

An application programming interface (API) can provide a set of services allowing applications to communicate with a storage system. The API provides services, for example, such as reading a database, automatic materialization, update tracking, and/or saving of changes and the like. The API provides hooks for logic and policy injection and enforcement, the nature of which can be augmented (see infra).

Schema Language Extensions

Embodiments provided herein allow a dynamically typed storage system schema language such as, for example, the WinFS schema language to be extended such that each type has two additional Boolean attributes—TrustsPreviousVersions and TrustsSuperType. These attributes indicate whether the type's logic and/or constraints are compatible with its previous versions and/or supertype respectively such that an instance of this type partially materialized cannot be edited in any manner such that it violates this type's logic or constraints. A type declares its trust only to its immediate super-type. When partial materialization fails to materialize multiple subtypes in the instance type hierarchy each type's trust declaration is examined in turn and the instance's trust level is defined as the Boolean summation of these calculations.

Each type has an additional optional multi-valued attribute—StructuralCompositions, listing by name the set of compositions that can be used to form an Item with this type as the core Entity. These compositions are considered "structural." Only those Entities in the Item-Entity graph connected to a core Entity by an unbroken chain of structural compositions can be considered for consistency. This enables logic and constraint aspects to span multiple Entities where more than one type is involved. Limiting consistency to structural compositions allows type designers to protect application stability and predictability from over extension. Type designers can provide a set of structural compositions that provide a balance between the immediate needs of the application and extensibility without opening types up to unfettered extensibility that can render existing application experiences unmaintainable given the logic enforcement policy described infra.

Each composition has an additional Boolean attribute—CanBeStructural indicating its applicability for membership in a type's StructuralCompositions set. Only those compositions with a value of 'True' for this attribute can appear in the StructuralCompositions set of a type. This opt-in model for compositions allows applications to create Entities explicitly attached to Items for open data extensibility without impacting other applications' experiences. An Entity attached to an Item by a non-structural composition can never cause a degraded experience in an application that lacks the logic for that Entity since that Entity will never be considered for consistency. Marking a composition as CanBeStructural='False' ensures that no type places that composition in its StructuralCompositions set and infringes the open extensibility intension of the composition designer.

Each property on a type has an additional Boolean attribute—NotValidated indicating whether that attribute can participate in logic or constraints. Properties marked as NotValidated='True' never play a role in the consistency of an Item. Application experiences designed over NotValidated='True' properties can never be degraded regardless of what the most derived type of the instance is or the set of logic available to the application. Since NotValidated='True' properties don't participate in the consistency of an Item they are always safe to update regardless of whether consistency can be evaluated.

Update Extensions

Embodiments provided herein allow a dynamically typed storage system API such as, for example, WinFS API's to extend change tracking and update systems such that all entities read from a storage system can be subject to partial materialization and a BitBucket can be populated for all non-materialized data. Metadata can also be available for all types in the system regardless of what subset of types an application contains logic/implementation for. This metadata can indicate a set of new annotations detailed in the schema language changes supra. Update parameters such as, for example, WinFS's SaveChanges can now perform the following additional steps while enumerating a set of changed Entities for persistence:

For each changed entity, if all of the changes to an Entity are to NotValidated properties, a change proceeds and changes are written to a storage system with no further action.

For each changed entity, IsWritable is called. IsWritable is a non-virtual method that examines an Entity's Bit-Bucket (and optionally any BitBuckets for nested complex types within the Entity) and cross references non-materialized types in the BitBucket with Metadata for those types. If any type in the BitBucket does not indicate (transitively in some cases) a trust relationship with the actual materialized type then update for the Entity fails and an exception is thrown.

For each changed entity, IsValid is called on Entities participating in a structural closure of an Item to which the Entity belongs. If the Entity is not structural relative to the Item to which it belongs, the closure is defined to include the Entity itself and nothing else. If the Entity is structural relative to the Item, the closure is defined as the set of Entities reachable from the core Entity via structural compositions. The set of Entities in the closure is determined by the true Metadata. Objects in the closure that are not already loaded are loaded immediately and IsWritable is called on them. No logic, including IsValid, for types not materialized is run by the application. (Determination of whether it is safe to execute only the logic of the materialized types is determined by IsWritable above.) IsValid is a non-virtual method that succeeds if and only if the Entity in its post change state meets the consistency requirements of the type on which it was implemented. Though IsValid is non-virtual, it can have overloaded implementations at one or more types in the type hierarchy. Each implementation is called in turn and no type can prevent its super or sub types' implementation from being run. (The order in which all overloads of IsValid for a given instance are executed is not defined herein as different implementations can choose different orders. For example, WinFS implements an order such that ancestral types IsValid is executed before subtypes.) IsValid cannot make additional modifications to an instance but only gives an assessment of the correctness of the current set of modifications. If consistency is not met, an exception occurs and the update fails.

For each entity whose changes are written to the storage system, storage system-based logic (e.g., Policy) applicable to that Entity can be evaluated by the storage system prior to commit. This logic can apply to both types materialized by the application and types not materialized by the application because a storage system is always aware of the total set of types in the system.

All operations on the set of Entities in the set are atomically allowed or disallowed, so any failure by the IsWritable or IsValid methods or Policy of any Entity in the set or its closures prevents changes from being committed for all Entities in the set.

Method execution for type method can be extended such that instance methods not marked as Platform Verbs, before executing, call IsWritable on the Entity. This ensures that the appropriate version of the method (particularly in the case of virtual methods) is available in the application for execution. The body of the method can additionally call IsWritable on other Entities if broader guarantees of materialization are required (such as Item level writability). Instance methods marked as Platform Verbs execute immediately and their modifications can be written to the storage system without being subject to locally available logic. These methods are still subject to storage system-based logic (Policy). An example of a Platform Verb might be the Delete method. No particular application can override or alter the behavior of the Delete method on a type by type basis, but it can still be subject to system wide policy implemented in the storage system.

In view of the exemplary systems shown and described above, methodologies that may be implemented in accordance with the embodiments will be better appreciated with reference to the flow charts of FIGS. 4-8. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 4:
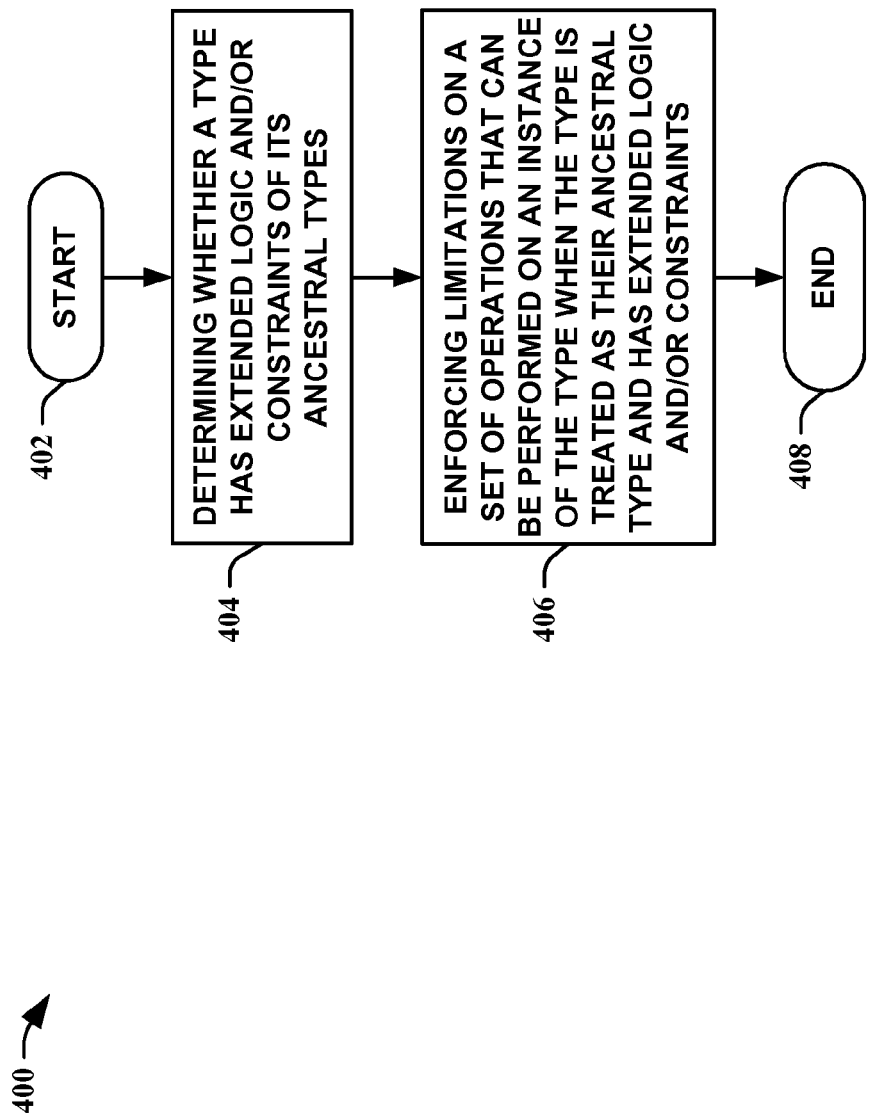
FIG. 4 is a flow diagram of a method of extending types of a dynamically typed storage system in accordance with an aspect of an embodiment.

In FIG. 4, a flow diagram of a method 400 of extending types of a dynamically typed storage system in accordance with an aspect of an embodiment is shown. The method 400 starts 402 by determining whether a type has extended logic and/or constraints of its ancestral types 404. The determination can include both client and server-side logic and can also utilize indicators set by software developers for a core or super type. Limitations on a set of operations that can be performed on an instance of the type are then enforced when the type is treated as their ancestral type and has extended logic and/or constraints 406, ending the flow 408. The limitations can include strictly constraints or logic. The run-time logic is generally derived from constraints associated with an ancestral type.

Figure 5:
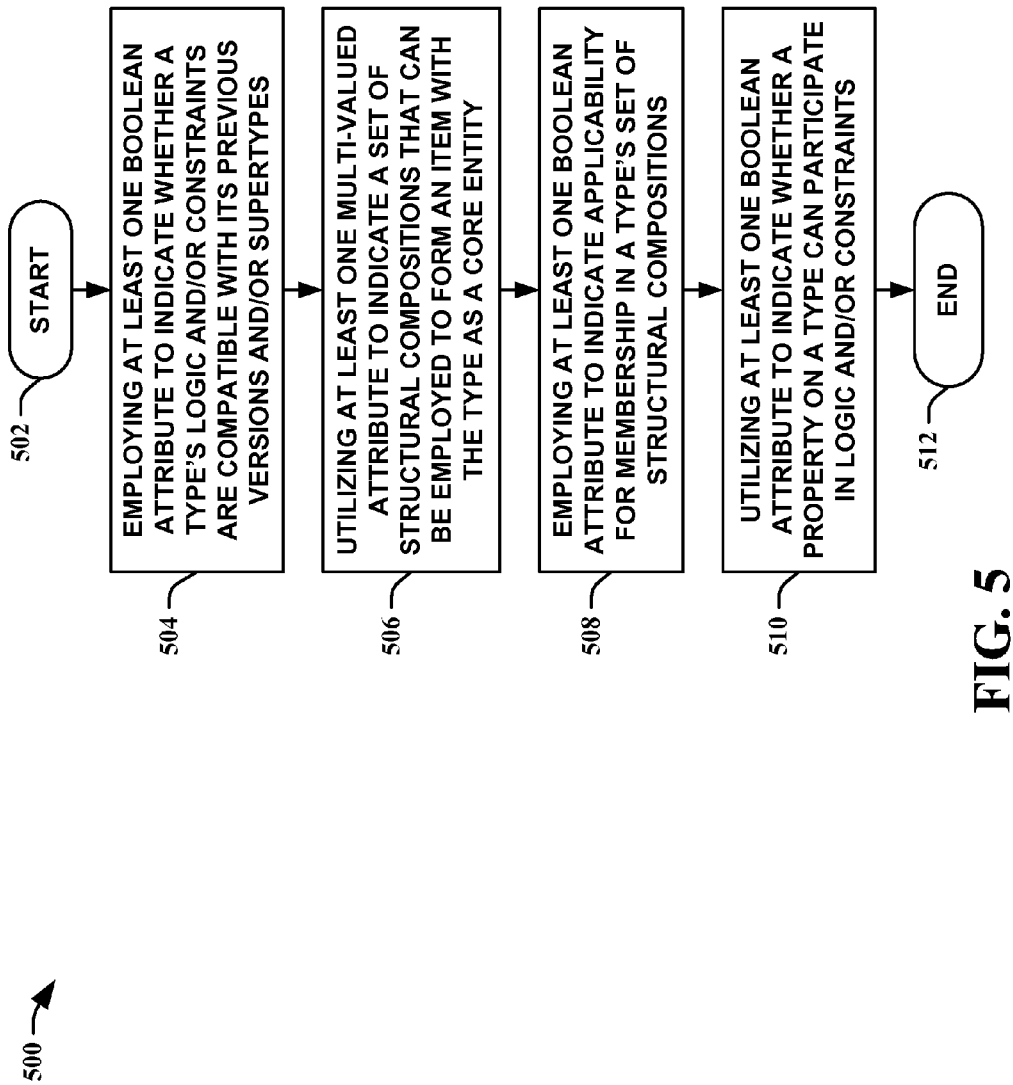
FIG. 5 is a flow diagram of a method of extending a schema language for a dynamically typed storage system in accordance with an aspect of an embodiment.

Turning to FIG. 5, a flow diagram of a method 500 of extending a schema language for a dynamically typed storage system in accordance with an aspect of an embodiment is illustrated. In one example embodiment, the foregoing can be implemented utilizing extensible markup language (XML) and the like. The method 500 starts 502 by employing at least one Boolean attribute to indicate whether a type's logic and/or constraints are compatible with its previous versions and/or supertypes 504. For example, as noted supra, TrustsPreviousVersions and TrustsSuperType Boolean indicators can be utilized. With these attributes, an instance of this type partially materialized cannot be edited in any manner such that it violates this type's logic or constraints. A type declares its trust only to its immediate supertype. When partial materialization fails to materialize multiple subtypes in the instance type hierarchy, each type's trust declaration is examined in turn and the instance's trust level is defined as the Boolean summation of these calculations.

At least one multi-valued attribute is utilized to indicate a set of structural compositions that can be employed to form an item with the type as a core entity 506. Only those Entities in an Item-Entity graph connected to a core Entity by an unbroken chain of structural compositions can be considered for consistency. This enables logic and constraints to span multiple Entities where more than one type is involved. Limiting consistency to structural compositions allows type designers to protect application stability and predictability from over extension. Type designers can provide a set of structural compositions that provide a balance between the immediate needs of the application and extensibility without opening types up to unfettered extensibility.

At least one Boolean attribute is employed to indicate applicability for membership in a type's set of structural compositions 508. Only those compositions with a value of 'True' for this attribute can appear in the StructuralCompositions set of a type. This opt-in model for compositions allows applications to create Entities explicitly attached to Items for open data extensibility without impacting other applications' experiences. An Entity attached to an Item by a non-structural composition can never cause a degraded experience in an application that lacks the logic for that Entity since that Entity will never be considered for consistency. Marking a composition as, for example, CanBeStructural='False' ensures that no type places that composition in its StructuralCompositions set and infringes the open extensibility intension of the composition designer.

At least one Boolean attribute is utilized to indicate whether a property on a type can participate in logic and/or constraints 510, ending the flow 512. For example, properties marked as NotValidated='True' never play a role in the consistency of an Item. Application experiences designed over NotValidated='True' properties can never be degraded regardless of what the most derived type of the instance is or the set of logic available to the application. Since NotValidated='True' properties don't participate in the consistency of an Item, they are always safe to update regardless of whether consistency can be evaluated.

Figure 6:
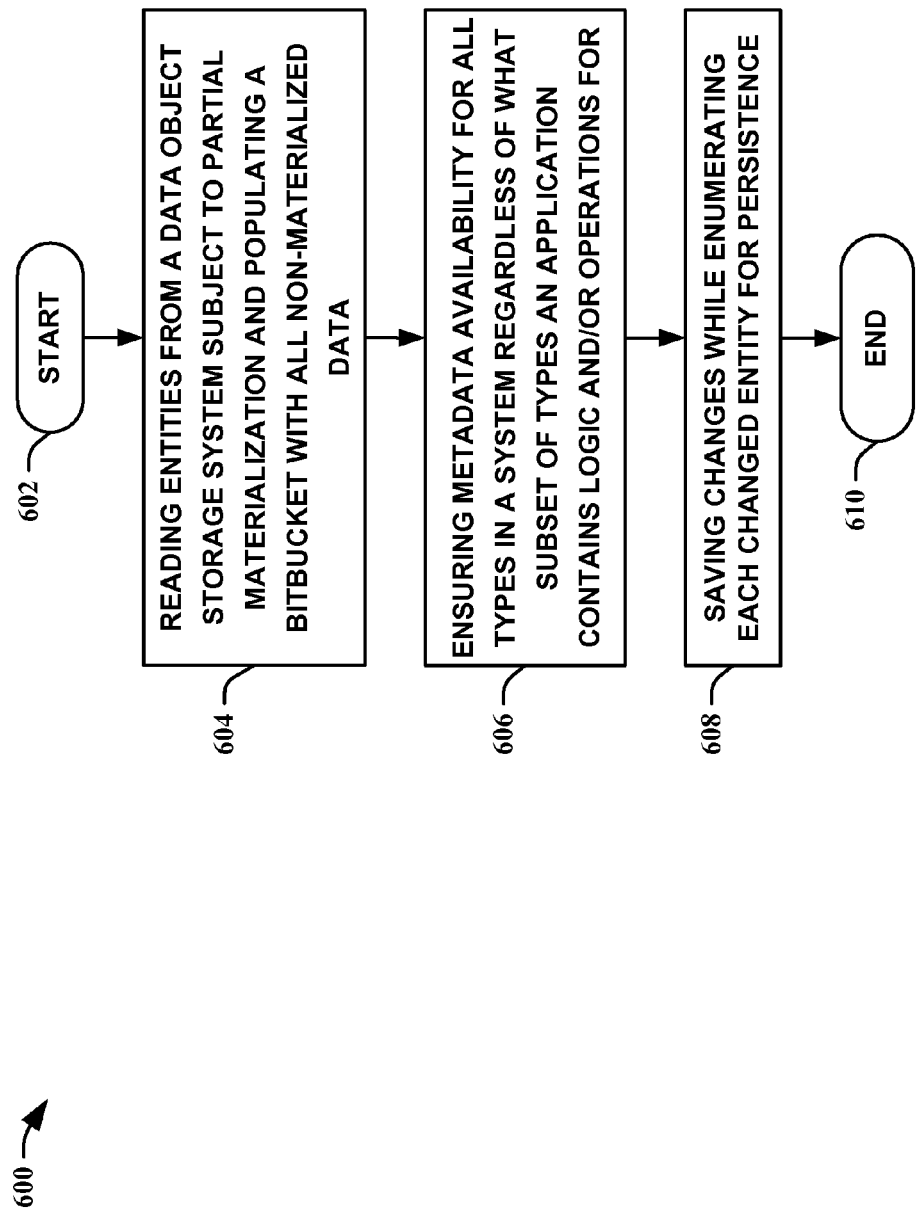
FIG. 6 is a flow diagram of a method of extending a change tracking and update system application programming interface (API) for a dynamically typed storage system in accordance with an aspect of an embodiment.

Looking at FIG. 6, a flow diagram of a method 600 of extending a change tracking and update system application programming interface (API) for a dynamically typed storage system in accordance with an aspect of an embodiment is depicted. The method 600 starts 602 by reading entities from a data object storage system subject to partial materialization and populating a BitBucket with all non-materialized data 604. Metadata availability for all types in a system is ensured regardless of what subset of types an application contains logic and/or operations for 606. The metadata indicates a set of new annotations. Changes are saved while enumerating each changed entity for persistence 608, ending the flow 610. Details on saving the changes are provided supra and infra.

Figure 7:
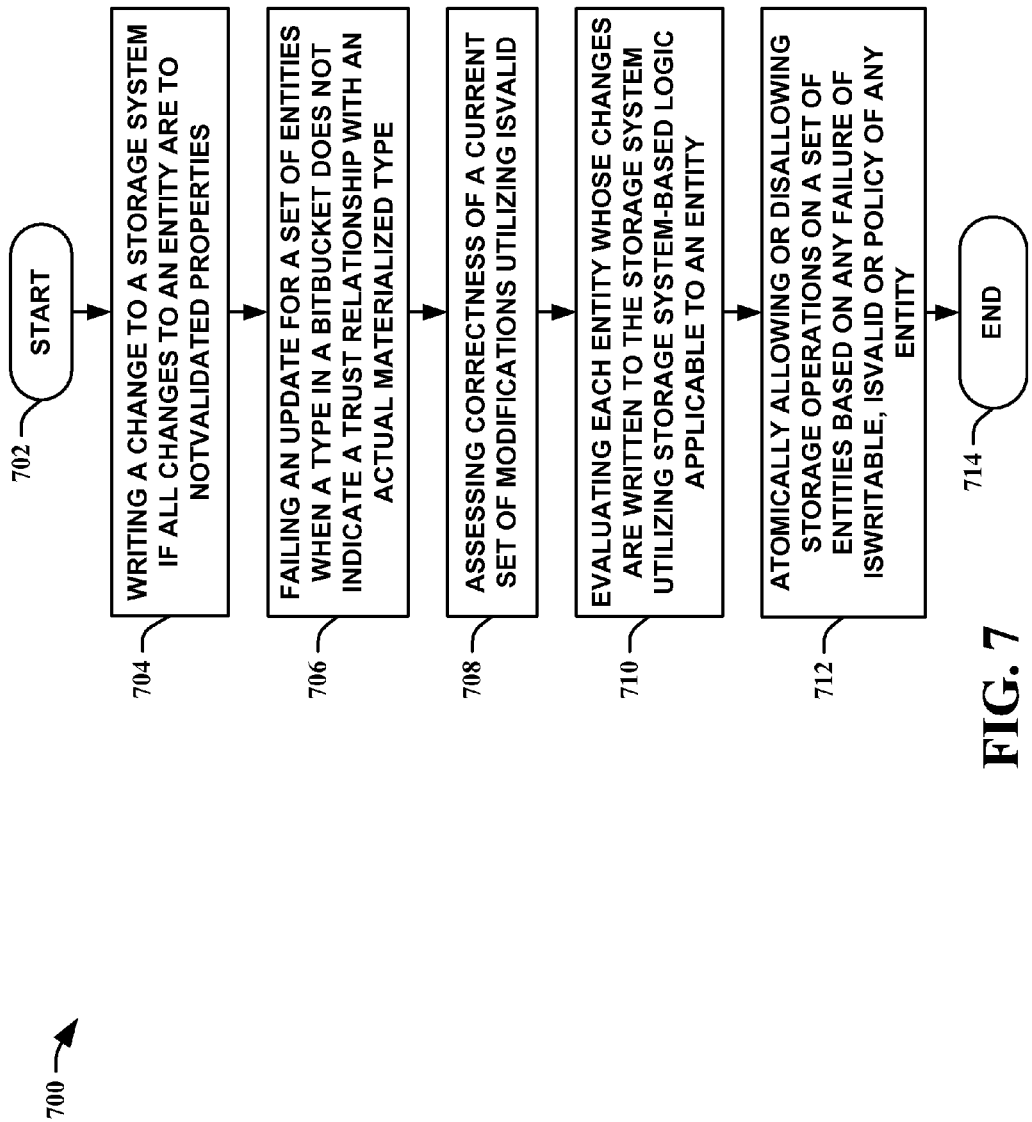
FIG. 7 is a flow diagram of a method of saving type changes for a dynamically typed storage system in accordance with an aspect of an embodiment.

In FIG. 7, a flow diagram of a method 700 of saving type changes for a dynamically typed storage system in accordance with an aspect of an embodiment is shown. The method 700 starts 702 by writing a change to a storage system if all changes to an entity are to NotValidated properties 704. For each changed entity, if all of the changes to an Entity are to NotValidated properties the change proceeds and the changes are written to the storage system with no further action. An update for a set of entities is failed when a type in a BitBucket does not indicate a trust relationship with an actual materialized type 706. For example, for each changed entity, IsWritable can be called. IsWritable is a non-virtual method that examines the Entity's BitBucket (and optionally any BitBuckets for nested complex types within the Entity) and cross references the non-materialized types in the BitBucket with the Metadata for those types. If any type in the BitBucket does not indicate (transitively in some cases) a trust relationship with the actual materialized type then update for the Entity fails and an exception is thrown Correctness of a current set of modifications is assessed utilizing IsValid 708. For example, for each changed entity, IsValid can be called on Entities participating in a structural closure of an Item to which an Entity belongs. If the Entity is not structural relative to the Item to which it belongs, the closure is defined to include the Entity itself and nothing else. If the Entity is structural relative to the Item, the closure is defined as the set of Entities reachable from the core Entity via structural compositions. The set of Entities in the closure is determined by the true Metadata. Objects in the closure that are not already loaded are loaded immediately and IsWritable is called on them. No logic, including IsValid, for types not materialized is ever run by the application. IsValid is a non-virtual method that succeeds if and only if the Entity in its post change state meets the consistency requirements of the type on which it was implemented. Though IsValid is non-virtual, it may have overloaded implementations at one or more types in the type hierarchy. Each implementation can be called in turn and no type can prevent its super or sub types' implementation from being run. IsValid cannot make additional modifications to the instance but only gives an assessment of the correctness of the current set of modifications. If consistency is not met, an exception occurs and the update fails.

Each entity whose changes are written to the storage system is evaluated utilizing storage system-based logic applicable to an entity 710. For example, this logic may apply to both types materialized by the application and types not materialized by the application because the storage system is always aware of the total set of types in the system. Storage operations on a set of entities are atomically allowed or disallowed based on any failure of IsWritable, IsValid or policy of any entity 712, ending the flow 714. For example, any failure by the IsWritable or IsValid methods or Policy of any Entity in the set or its closures prevents changes from being committed for all Entities in the set.

Figure 8:
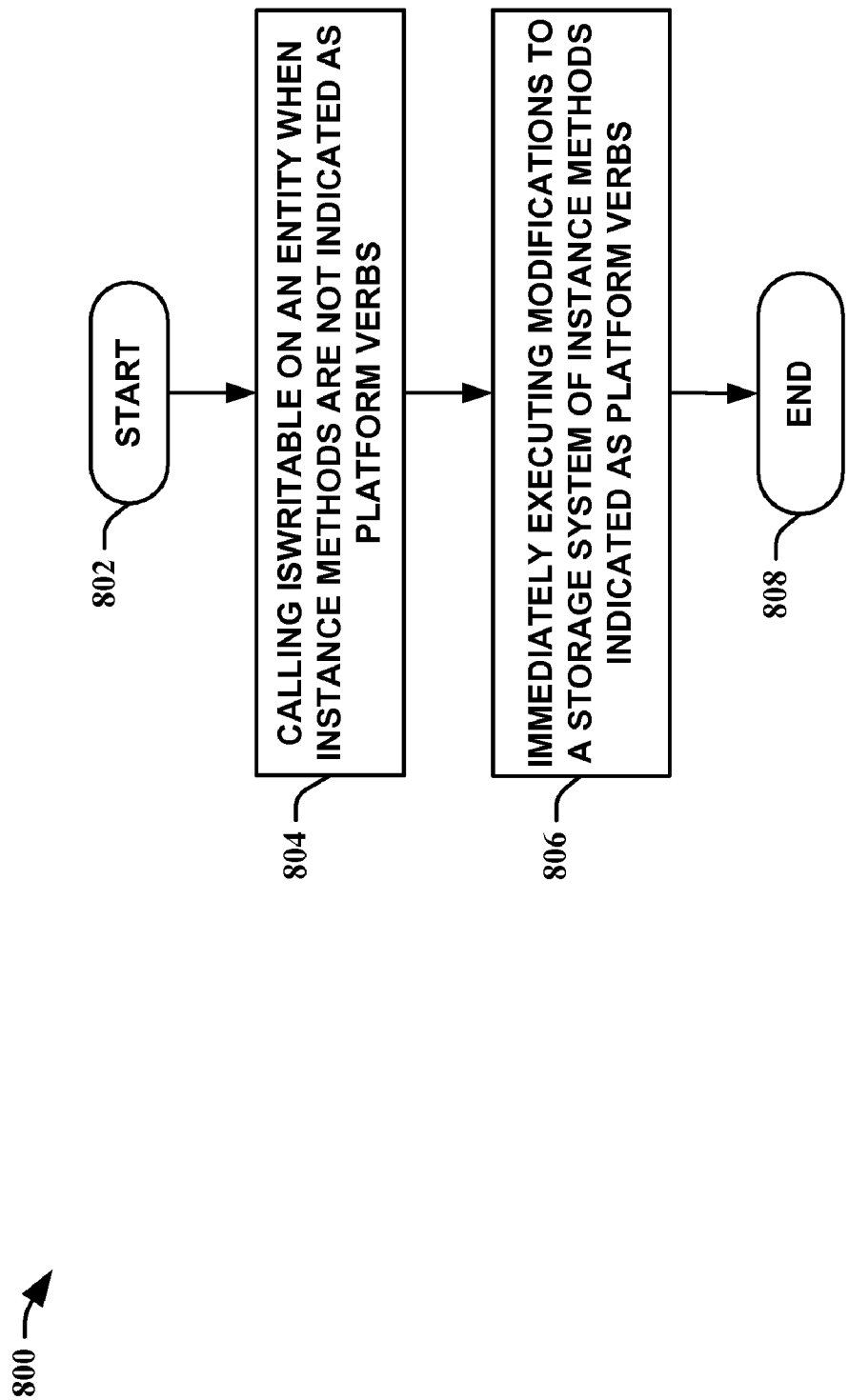
FIG. 8 is a flow diagram of a method of extending method execution for a type method for a dynamically typed storage system in accordance with an aspect of an embodiment.

Referring to FIG. 8, a flow diagram of a method 800 of extending method execution for a type method for a dynamically typed storage system in accordance with an aspect of an embodiment is depicted. The method 800 starts 802 by calling IsWritable on an entity when instance methods are not indicated as Platform Verbs 804. This ensures that the appropriate version of a method (particularly in the case of virtual methods) is available in an application for execution. The body of the method can additionally call IsWritable on other Entities if broader guarantees of materialization are required (such as Item level writability). Modifications to a storage system of instance methods indicated as Platform Verbs are immediately executed 806, ending the flow 808. Instance methods marked as Platform Verbs execute immediately and their modifications are written to a storage system without being subject to locally available logic. These methods are still subject to storage system-based logic (Policy).

Figure 9:
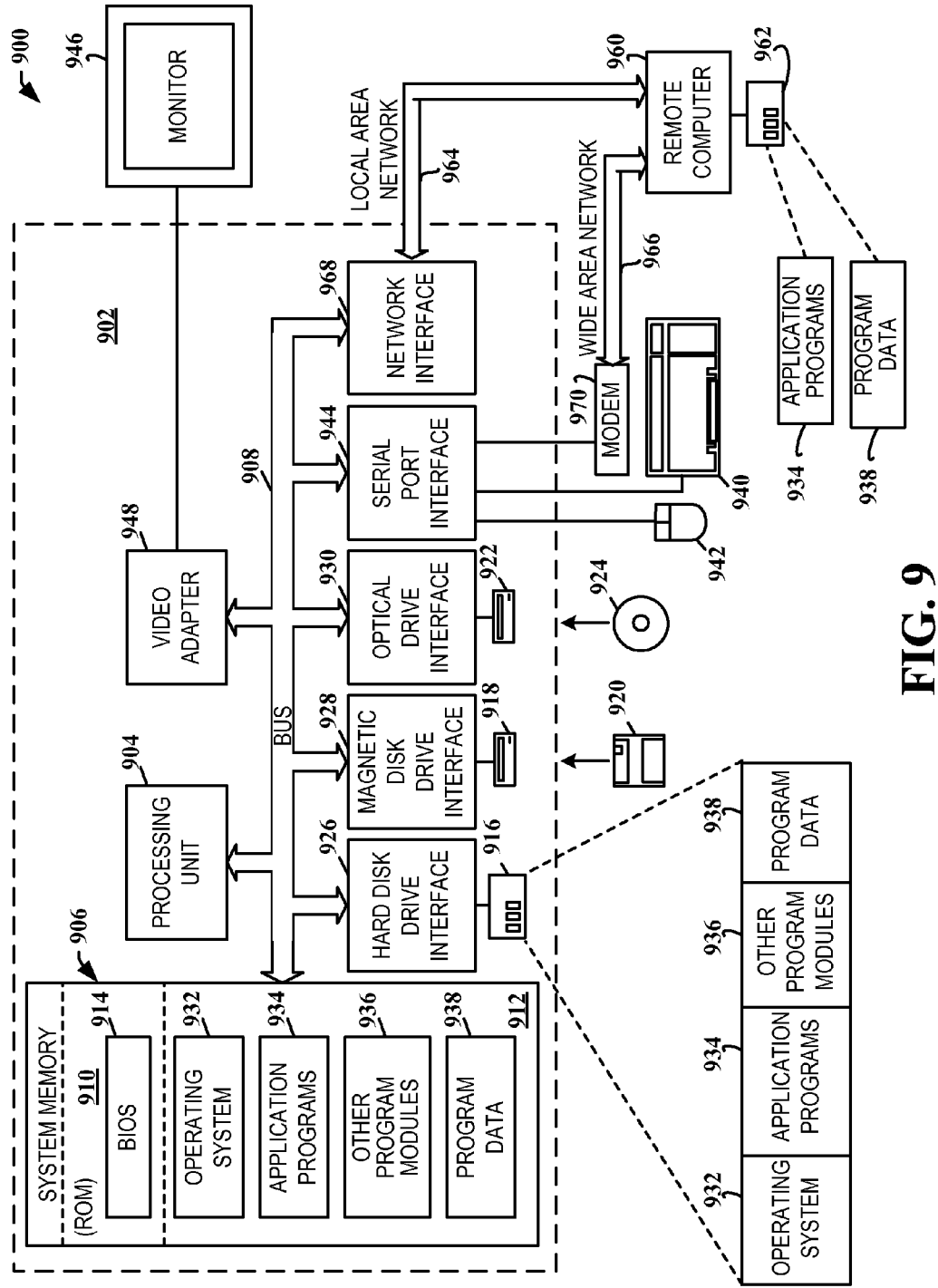
FIG. 9 illustrates an example operating environment in which an embodiment can function.

In order to provide additional context for implementing various aspects of the embodiments, FIG. 9 and the following discussion is intended to provide a brief, general description of a suitable computing environment 900 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on standalone computers. In a distributed computing environment, program modules can be located in local and/or remote memory storage devices.

With reference to FIG. 9, an exemplary system environment 900 for performing the various aspects of the embodiments include a conventional computer 902, including a processing unit 904, a system memory 906, and a system bus 908 that couples various system components, including the system memory, to the processing unit 904. The processing unit 904 can be any commercially available or proprietary processor. In addition, the processing unit can be implemented as multi-processor formed of more than one processor, such as can be connected in parallel.

The system bus 908 can be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also can include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 900, and further that any such media can contain computer-executable instructions for performing the methods of the embodiments.

A number of program modules can be stored in the drives 916-922 and RAM 912, including an operating system 932, one or more application programs 934, other program modules 936, and program data 938. The operating system 932 can be any suitable operating system or combination of operating systems. By way of example, the application programs 934 and program modules 936 can include a data type extension scheme in accordance with an aspect of an embodiment.

A user can enter commands and information into the computer 902 through one or more user input devices, such as a keyboard 940 and a pointing device (e.g., a mouse 942). Other input devices (not shown) can include a microphone, a joystick, a game pad, a satellite dish, a wireless remote, a scanner, or the like. These and other input devices are often connected to the processing unit 904 through a serial port interface 944 that is coupled to the system bus 908, but can be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 can include other peripheral output devices (not shown), such as speakers, printers, etc.

It is to be appreciated that the computer 902 can operate in a networked environment using logical connections to one or more remote computers 960. The remote computer 960 can be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g. wired or wireless) of establishing a communications link between the computers 902 and 960 can be used when carrying out an aspect of an embodiment.

In accordance with the practices of persons skilled in the art of computer programming, the embodiments have been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
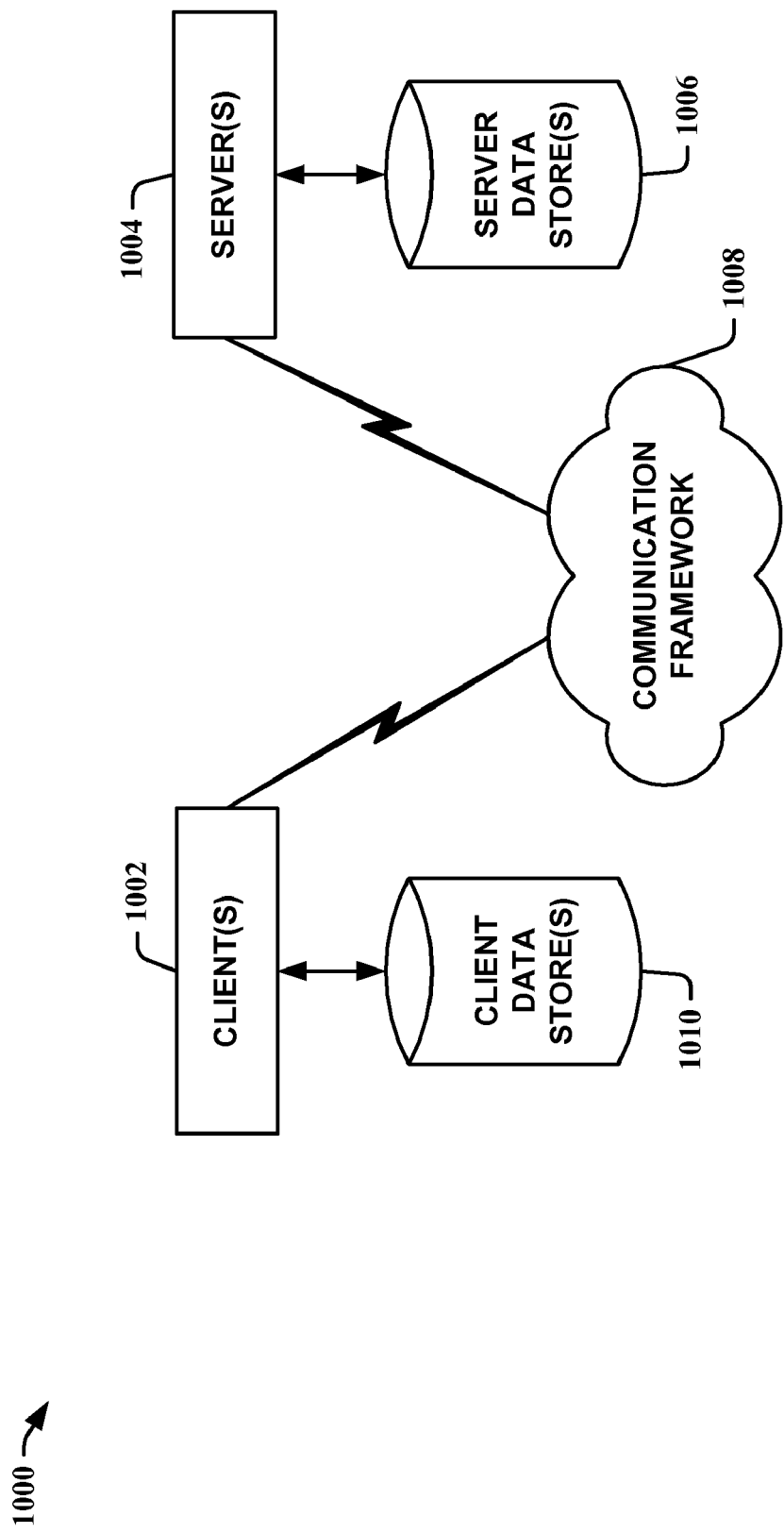
FIG. 10 illustrates another example operating environment in which an embodiment can function.

FIG. 10 is another block diagram of a sample computing environment 1000 with which embodiments can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 can be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the embodiments can be utilized in an object type extension facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that extends data object types in an object persistent system, comprising:
   a processor that executes the following computer executable components stored on a computer readable medium:
      an ancestral association component that determines whether an object type in a schema language has extended logic or constraints pertaining to being treated as a plurality of its ancestral types at run-time, the object type and ancestral types arranged in an instance type hierarchy, each ancestral type having a Boolean value indicating a trust level for another ancestral type immediately above the ancestral type within the instance type hierarchy;
      a limitation enforcement component that enforces the constraints or logic on a set of operations performed on an instance of the object type in the schema language using run-time logic when the instance is treated as a plurality of its ancestral types, wherein the object type includes a first property displayable in an object-type-designer user interface; and
      a run-time logic component that creates the run-time logic, the run-time logic being configured to prevent the object-type-designer user interface from being able to modify the first property of the object type based on a trust level for the objet type, the trust level for the object type determined by combining the trust levels from each of the plurality of ancestral types into the trust level for the object type, the trust level for the object type calculated from a Boolean summation that combines the Boolean values for each of the plurality of ancestral types into a Boolean value representing the trust level for the object type.

2. The system of claim 1, the ancestral association component determines logic or constraints from extensible markup language (XML) declarations.

3. The system of claim 1, is a federated system that operates on a client and a server.

4. A method for extending types of a dynamically typed storage system, comprising:
   employing a processor to execute computer executable instructions stored in memory to perform the following acts:
      determining whether a type in a schema language has extended logic or constraints pertaining to being treated as a plurality of its ancestral types at run-time, the type and ancestral types arranged in an instance type hierarchy, each ancestral type having a Boolean value indicating a trust level for another ancestral type immediately above the ancestral type within the instance hierarchy; and
      enforcing limitations on a set of operations that can be performed on an instance of the type in a schema language at run-time based on a trust level for the type, the trust level for the type determined by combing the trust levels for each of the plurality of ancestral types into the trust level for the type, the trust level for the type calculated from a Boolean summation that combines the Boolean values for each of the plurality of ancestral types in to a Boolean value representing the trust level for the type, wherein the type includes a first property displayable in an object-type-designer user interface, wherein the enforced limitations include preventing the object-type-designer user interface from being able to modify the first property of the type in a schema language based on the trust level for the type.

5. The method of claim 4, further comprising:
   utilizing at least one multi-valued attribute to indicate a set of structural compositions that can be employed to form an item with the type as a core entity.

6. The method of claim 4, further comprising:
   employing at least one Boolean attribute to indicate applicability for membership in a set of structural compositions of the type.

7. The method of claim 4, further comprising:
   reading entities from a data object storage system subject to partial materialization; and
   populating a BitBucket with all non-materialized data.

8. The method of claim 4, further comprising:
   ensuring metadata availability for types in a system regardless of what subset of types for which an application contains logic or operations.

9. The method of claim 4, further comprising:
   saving changes while enumerating each changed entity for persistence by:
      writing a change to a storage system if all changes to an entity are to NotValidated properties;
      failing an update for an entity when a type in a BitBucket does not indicate a trust relationship with an actual materialized type;
      assessing correctness of a current set of modifications utilizing IsValid;
      evaluating each entity whose changes are written to the storage system utilizing storage system-based logic applicable to an entity; and
      atomically allowing or disallowing storage operations on a set of entities based on any failure of IsWritable, IsValid or policy of any entity.

10. The method of claim 4, further comprising:
    extending method execution for a type method by:
       calling IsWritable on an entity when instance methods are not indicated as Platform Verbs; and
       immediately executing modifications to a storage system of instance methods indicated as Platform Verbs.

11. The method of claim 4, further comprising:
    utilizing partial materialization metadata at an instance level in conjunction with type specific metadata associated with compatibility to influence operations at runtime.

12. The method of claim 4, further comprising:
indicating to a software application via an application programming interface (API) whether limitations are enforced for a particular instance of the type.

13. The method of claim 12, further comprising:
employing the indicated enforced limitations to augment interactions with the software application.

14. A computer-implemented system that extends data object types in an object persistent system, comprising:
a processor that executes the following stored on a computer readable medium:
means for discovering whether a data object type has constraints or logic in a dynamically typed storage system schema language pertaining to being treated as a plurality of its ancestral types at run-time, the data objet type and ancestral types arranged in an instance type hierarchy, each ancestral type having a Boolean value indicating a trust level for another ancestral type immediately above the ancestral type within the instance hierarchy; and
means for limiting a set of operations based on a trust level for the data object type, the trust level for the data object type determined by combining the trust levels for each of the plurality of ancestral types into the trust level for the data object type, the trust level for the data object type calculated from a Boolean summation that combines the Boolean values for each of the plurality of ancestral types into a Boolean value representing the trust level for the data object type, wherein the data object type includes a first property displayable in an object-type-designer user interface, wherein the enforced limitations include preventing the object-type-designer user interface from being able to modify the first property of the data object type based on the trust level for the data object type.

15. The system of claim 1, the limitation enforcement component saves changes to the object type as a type persistent modification upon determining that the changes comply with the constraints or logic.

16. The system of claim 1, the constraints or logic relate to a set of structural compositions that are allowed to create the object type to protect the object type from over extension.

* * * * *